(12) United States Patent
Young

(10) Patent No.: US 10,882,642 B2
(45) Date of Patent: Jan. 5, 2021

(54) SYSTEM AND METHOD OF PRODUCING ARTIFICIAL GRAVITY IN AN ELECTROMAGNETIZED ENVIRONMENT

(71) Applicant: MaryAlice Diana Young, Jacksonville, FL (US)

(72) Inventor: MaryAlice Diana Young, Jacksonville, FL (US)

( * ) Notice: Subject to any disclaimer, the term of this patent is extended or adjusted under 35 U.S.C. 154(b) by 170 days.

(21) Appl. No.: 16/265,994

(22) Filed: Feb. 1, 2019

(65) Prior Publication Data
US 2019/0233138 A1 Aug. 1, 2019

Related U.S. Application Data

(60) Provisional application No. 62/625,073, filed on Feb. 1, 2018.

(51) Int. Cl.
| | |
|---|---|
| *B64G 1/46* | (2006.01) |
| *G01P 15/08* | (2006.01) |
| *H01F 7/06* | (2006.01) |
| *A61H 3/00* | (2006.01) |
| *B64G 6/00* | (2006.01) |
| *H01F 7/20* | (2006.01) |

(52) U.S. Cl.
CPC .............. *B64G 1/46* (2013.01); *A61H 3/008* (2013.01); *B64G 6/00* (2013.01); *G01P 15/08* (2013.01); *H01F 7/064* (2013.01); *H01F 7/204* (2013.01); *A61H 2201/1207* (2013.01); *A61H 2201/165* (2013.01)

(58) Field of Classification Search
CPC . B64G 1/46; B64G 6/00; A61H 3/008; A61H 2201/1207; A61H 2201/165; H01F 7/064; H01F 7/204; G01P 15/08
See application file for complete search history.

(56) References Cited

U.S. PATENT DOCUMENTS

| | | | | |
|---|---|---|---|---|
| 9,352,665 | B2 * | 5/2016 | Melvin | H02K 7/09 |
| 2006/0229160 | A1 * | 10/2006 | Talluri | A63B 21/005 |
| | | | | 482/1 |
| 2017/0197734 | A1 * | 7/2017 | Dharmaraj | B64G 1/12 |

OTHER PUBLICATIONS

A gravity loading countermeasure skinsuit, (Year: 2010), http://web.mit.edu/aeroastro/www/people/dnewman/pdf2/WaldieNewman_AA_GLCS_2011.pdf.*

* cited by examiner

*Primary Examiner* — Fred E Finch, III
*Assistant Examiner* — Rafael O De Leon Domenech

(57) ABSTRACT

A method of the producing artificial gravity in an electromagnetized environment is provided with a bodysuit, a corridor, a plurality of mobile electromagnets, a plurality of mobile inertial measurement units (IMUs), a plurality of first fixed electromagnets, second fixed electromagnets, and at least one computing unit. The first fixed magnets and the second fixed magnets are integrated throughout the corridor to continuously generate a uniform magnetic field through the corridor. The mobile electromagnets are integrated throughout the bodysuit to electromagnetically interact with the first fixed electromagnets and the second fixed electromagnets, which simulates gravity as the bodysuit moves through the corridor. The mobile IMUs are integrated to the bodysuit so that the mobile IMUs sends spatial positioning and orientation data to the computing unit. This feedback data allows for better gravity simulation because the computing unit can then directionally and magnitudinally adjust the electromagnetic field of each mobile electromagnet.

9 Claims, 9 Drawing Sheets

SYSTEM AND METHOD OF PRODUCING ARTIFICIAL GRAVITY IN AN ELECTROMAGNETIZED ENVIRONMENT

The current application claims a priority to the U.S. Provisional Patent application Ser. No. 62/625,073 filed on Feb. 1, 2018.

FIELD OF THE INVENTION

The present invention generally relates to generating artificial gravity. More specifically, the present invention uses an electromagnetized environment to simulate the effects of a body of mass in a gravitational field.

BACKGROUND OF THE INVENTION

Electromagnetism is a field of study that focuses on the physical interaction that occurs between electrically charged particles. Michael Faraday, Andre-Marie Ampere, Hans-Christian Orsted, and Albert Einstein are some of the pioneers in the field of electromagnetism. As Michael Faraday stated, a changing magnetic field creates an electric field. The present invention expects to utilize the properties of electromagnetism to resolve issues related to micro-gravity.

Due to the lack of gravity in outer space, astronauts undergo significant changes to muscle and skeletal health. The present invention expects to introduce a method that can mitigate the dangers related to lack of gravity in outer space. More specifically, the present invention introduces a method to utilize electromagnetic interactions to simulate the gravity of earth in outer space. In doing so, the present invention introduces is a wearable suite that consists of electromagnets, force sensors, mini-computers and corridors, to create artificial gravity environments in space or low gravity areas. The system would adjust small electromagnets on the suite to increase/decrease current/voltage based on distance from the main electromagnet to match the items required weight. If attached to arm, the force would be adjusted to say 90N (20 lbs), if attached to feet, the force would be adjusted to say 120N.

DETAILED DESCRIPTION OF THE INVENTION

All illustrations of the drawings are for the purpose of describing selected versions of the present invention and are not intended to limit the scope of the present invention.

Figure 1:
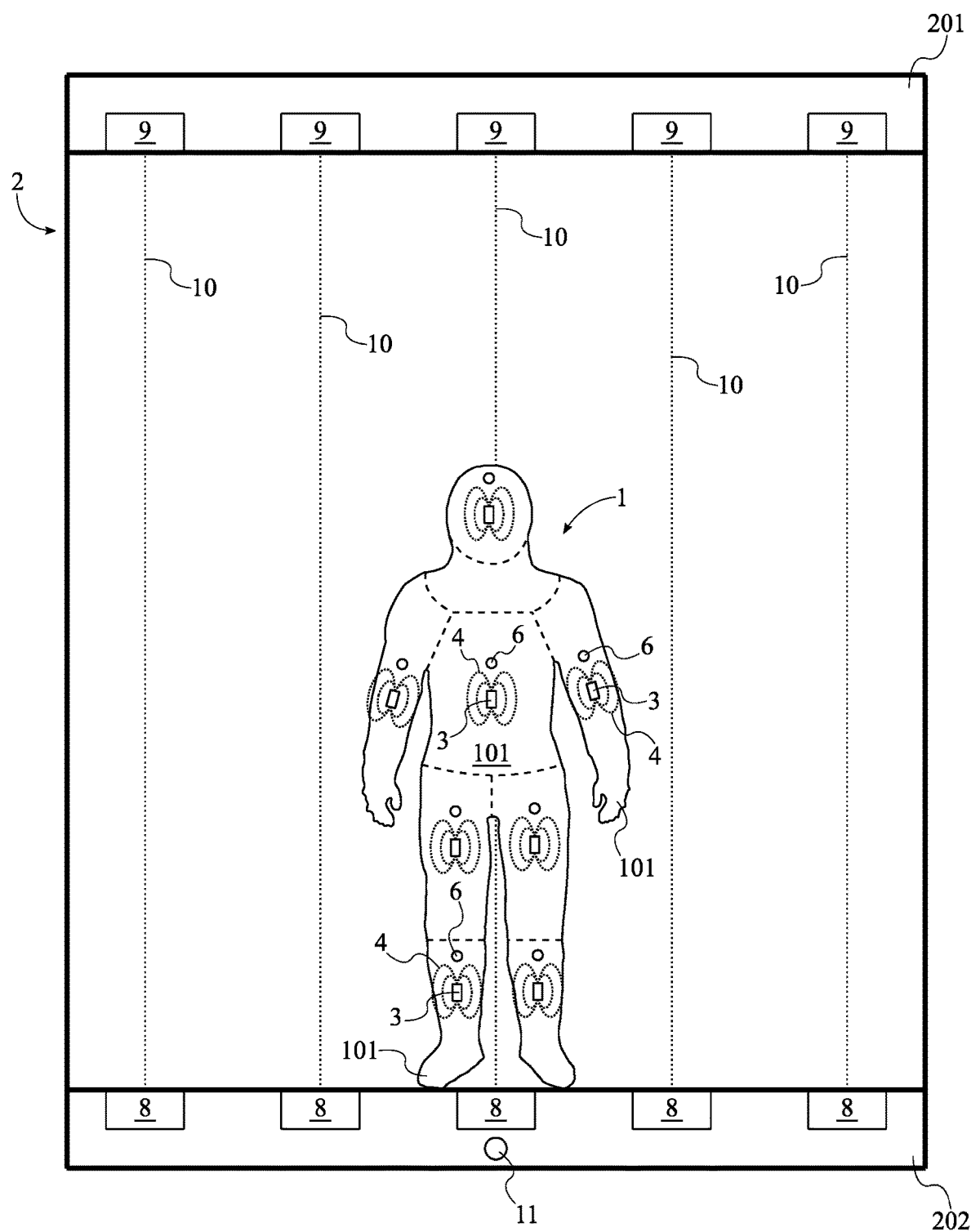
FIG. 1 is a schematic view illustrating the system of the present invention.
Figure 2:
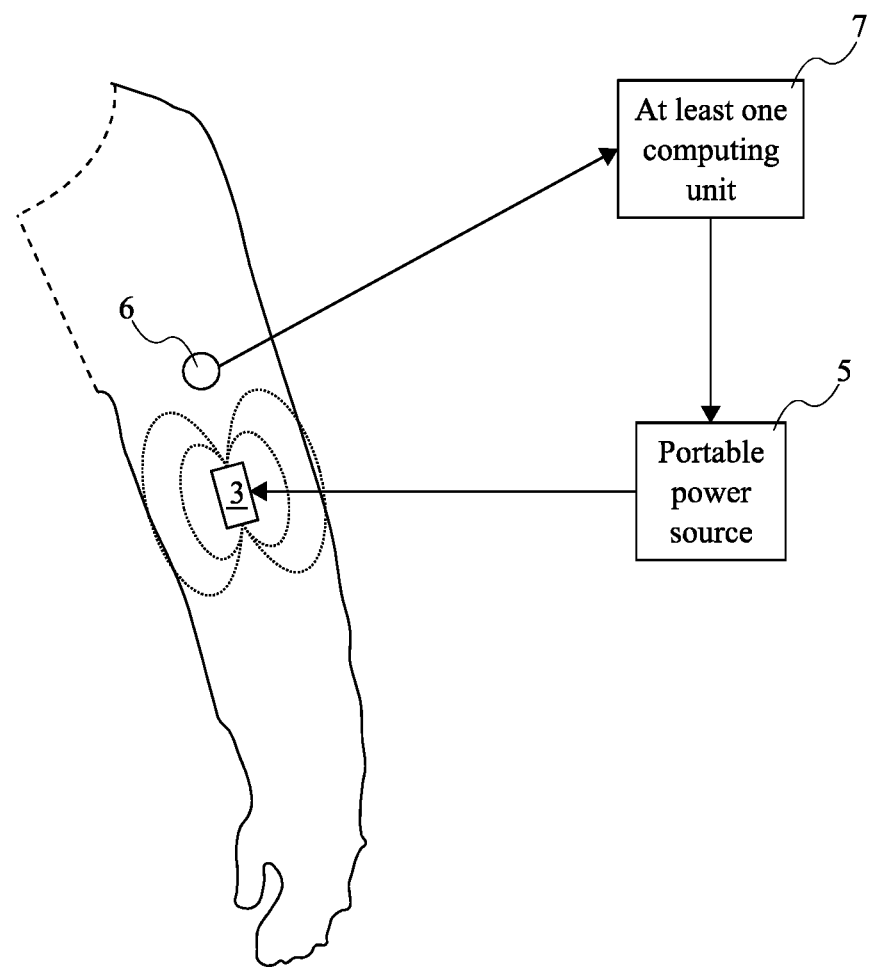
FIG. 2 is a schematic view illustrating the electronic and electrical connections for the system of present invention.
Figure 3:
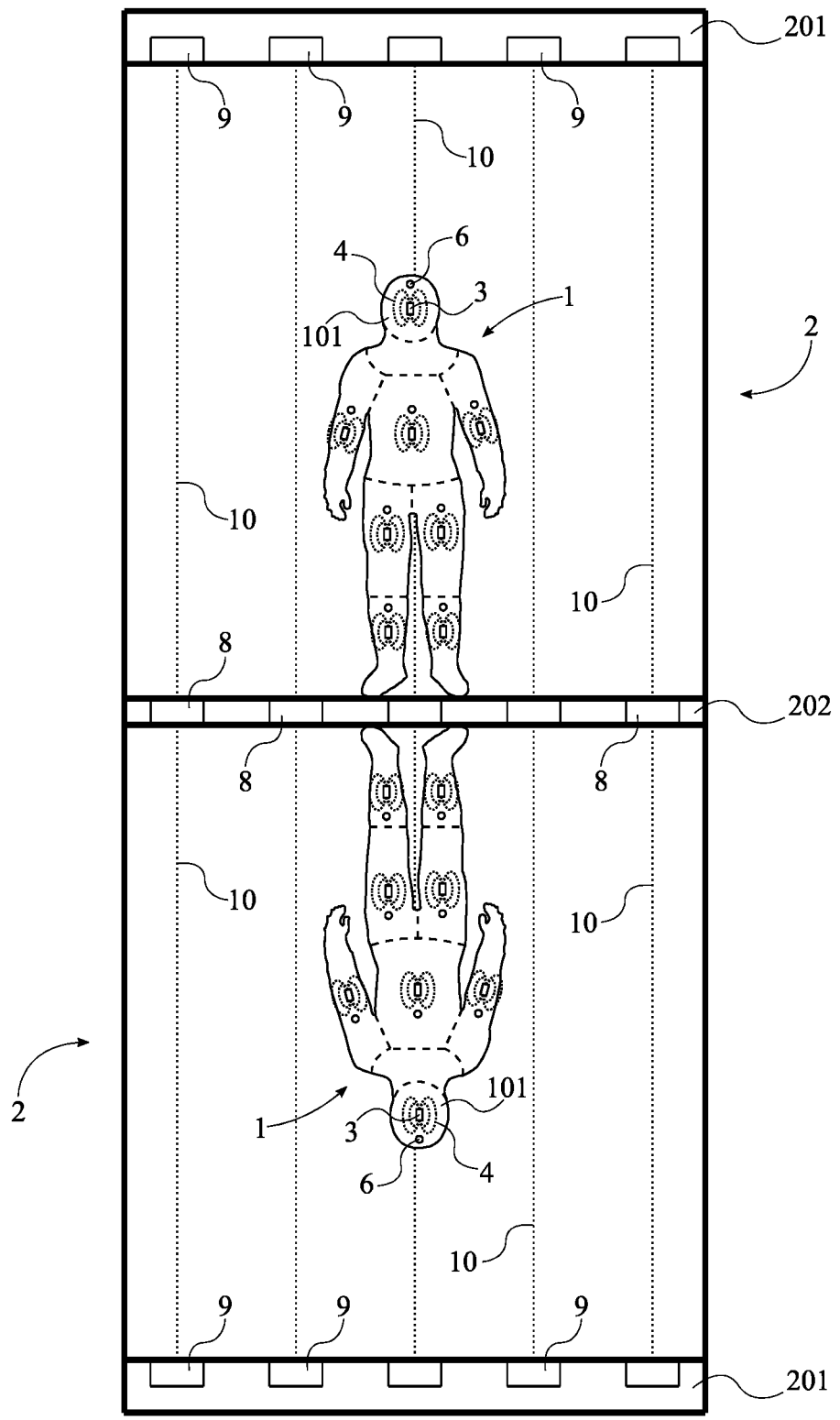
FIG. 3 is a schematic view illustrating modular units for the system of the present invention being coupled to function together.

The present invention is a system and method of producing artificial gravity in an electromagnetized environment, which is able to mimic the gravitational force felt by a body of mass within a gravitational field. The present invention is used to be reduce the effects of muscle atrophy to a user in a weightless environment, such as outer space. The present invention can alternatively be used to increase or decrease the effects felt by a user in a gravitational field (e.g. if the user is recovering from a debilitating injury). As can be seen in FIGS. 1 and 2, the system for the present invention includes a bodysuit 1, a corridor 2, a plurality of mobile inertial measurement units (IMUs) 6, a plurality of mobile electromagnets 3, a plurality of first fixed electromagnets 8, a plurality of second fixed electromagnets 9, and at least one computing unit 7. The bodysuit 1 is worn by the user and preferably encloses the user's entire body. The corridor 2 generates an electromagnetized environment that can be roamed through by a user wearing the bodysuit 1. A floor 202 of the corridor 2 is used to mimic the ground in a gravitational field, but the floor 202 of the corridor 2 can be any surface that can be stood upon by the user. A ceiling 201 of the corridor 2 is the opposing side of the floor 202. The mobile electromagnets 3 are integrated throughout the bodysuit 1, while the first fixed electromagnets 8 are integrated throughout the floor 202, and the second fixed electromagnets 9 are integrated throughout the ceiling 201 (Step A). This arrangement for the mobile electromagnets 3, the first fixed electromagnets 8, and the second fixed electromagnets 9 allows for a magnetic attractive force between the mobile electromagnets 3 and the first fixed electromagnets 8 and a magnetic repelling force between the mobile electromagnets 3 and the second fixed electromagnets 6 to mimic the gravitational force felt between two bodies of mass. The mobile IMUs 6 are integrated throughout the bodysuit 1 so that the present invention can track the movement for different parts of the body with the mobile IMUs 6. The computing unit 7 is used to coordinate the functionalities amongst the mobile electromagnets 3 and the mobile IMUs 6, and, thus, each mobile electromagnet 3 and each mobile IMU 6 is communicably coupled to the computing unit 7 (Step B). As can be seen FIG. 3, the system of the present invention can be modular units so that the first fixed electromagnets 8 of one modular unit can be used as the second fixed electromagnets 9 of an adjacent modular unit.

Figure 4A:
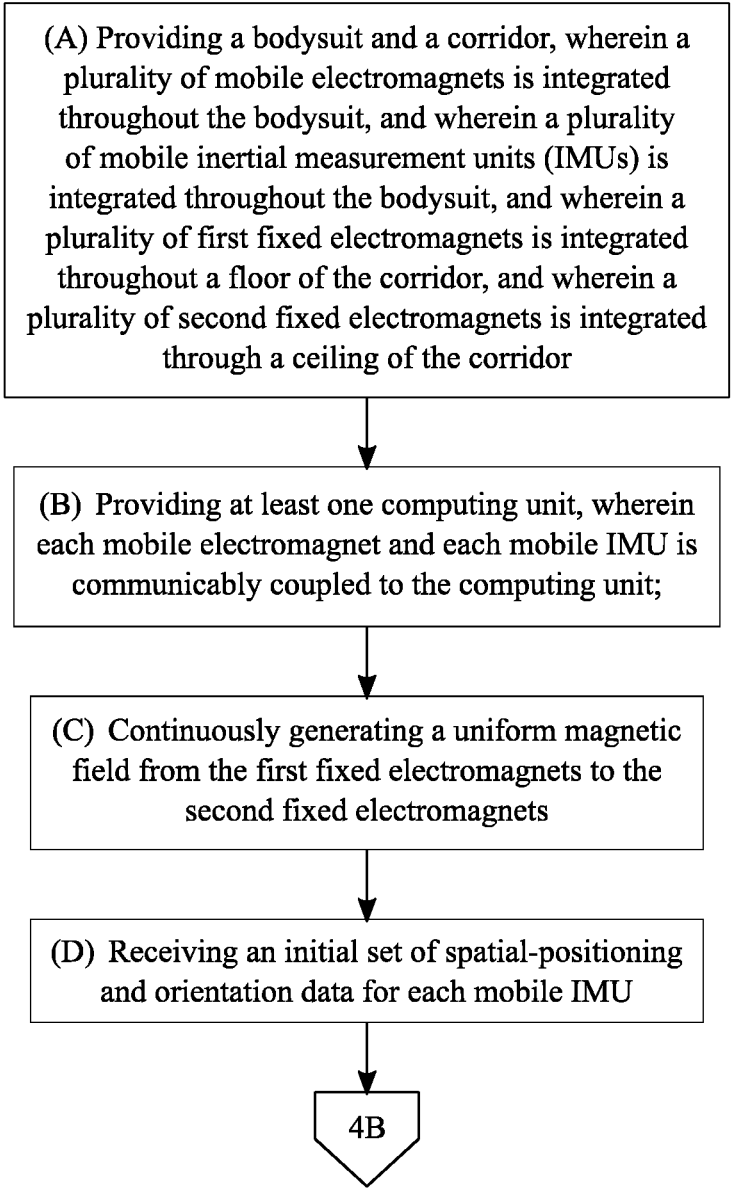
FIG. 4A is a flowchart illustrating the overall process for the method of the present invention.
Figure 4B:
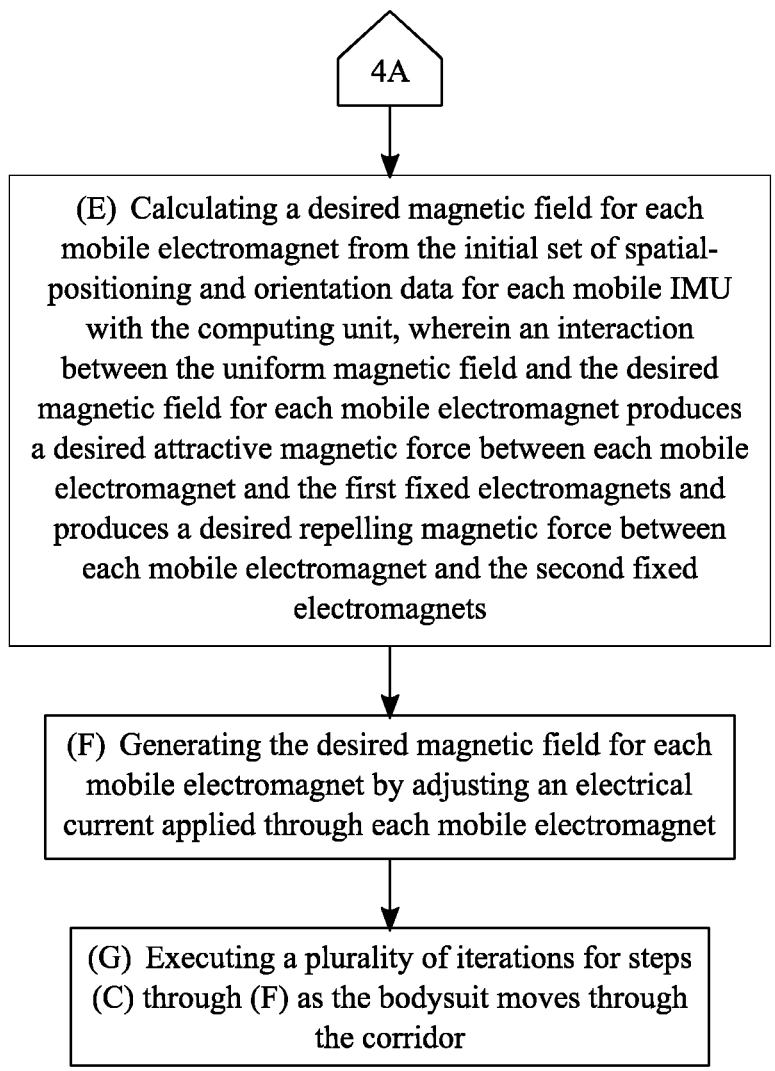
FIG. 4B is a continuation of the flowchart in FIG. 4A.

As can be seen in FIGS. 4A and 4B, the overall process followed by the method of the present invention allows for the production of artificial gravity through an attractive magnetic force. The overall process begins by continuously generating a uniform magnetic field 10 from the first fixed electromagnets 8 to the second fixed electromagnets 9 (Step C). The uniform magnetic field 10 is a magnetic field of equal strength throughout the area positioned between the floor 202 and the ceiling 201. The overall process continues by receiving an initial set of spatial-positioning and orientation data for each mobile IMU 6 (Step D). The initial set of spatial-positioning and orientation data allows the present invention to determine the exact spatial-positioning and orientation of the bodysuit 1 within the corridor 2. The computing unit 7 then calculates a desired magnetic field 4 for each mobile electromagnet 3 from the initial set of spatial-positioning and orientation data for each mobile IMU 6 (Step E). The desired magnetic field 4 for each mobile electromagnet 3 is calculated so that an interaction between the uniform magnetic field 10 and the desired magnetic field 4 of each mobile electromagnet 3 produces a desired attractive magnetic force between each mobile electromagnet 3 and the first fixed electromagnets 8. The desired magnetic field 4 for each mobile electromagnet 3 is also calculated so that the interaction between the uniform magnetic field 10 and the desired magnetic field 4 of each mobile electromagnet 3 also produces a desired repelling magnetic force between each mobile electromagnet 3 and the second fixed electromagnets 9. The desired attractive magnetic force and the desired repelling magnetic force that are felt by a user wearing the bodysuit 1 are specified to simulate the effects of gravity for the user. Consequently, the overall process continues by generating the desired magnetic field 4 for each mobile electromagnet 3 by adjusting an electrical current applied through each mobile electromagnet 3 (Step F), which allows each mobile electromagnet 3 to readily adjust the direction and magnitude of its magnetic field. The overall process concludes by executing a plurality of iterations for Step C through Step F as the bodysuit 1 moves through the corridor 2 (Step G) so that the present invention is able to continuously simulate the gravity through feedback and adjustment between the mobile IMUs 6 and the mobile electromagnets 3.

The present invention needs to configure the uniform magnetic field 10 and the desired magnetic field 4 for each mobile electromagnet 3 in order to produce the desired attractive magnetic force and the desired repelling magnetic force with the proper direction and magnitude to simulate the effects of gravity on a body of mass. Thus, the uniform magnetic field 10 is oriented normal from the floor 202 to the ceiling 201, and the desired magnetic field 4 for each mobile electromagnet 3 is orient normal towards floor 202 and away from the ceiling 201. These configurations for the uniform magnetic field 10 and the desired magnetic field 4 for each mobile electromagnet 3 are preferably meant to simulate a body of mass near the surface of the Earth.

The at least one computing unit 7 can be utilized as either a single computing unit or a plurality of computing units. The present invention preferably uses a plurality of computing units so that each computing unit is housed with a corresponding IMU from the plurality of mobile IMUs 6 and a corresponding electromagnet from the plurality of mobile electromagnets 3. Consequently, each computing unit is communicably coupled with the corresponding IMU and the corresponding electromagnet, which provides a plurality of independent units that are each able to sense their orientation and positioning within the corridor 2 and to readily adjust the magnetic force felt on themselves.

In order for the present invention to accurately mimic the effects of gravity on a user's body, the bodysuit 1 needs to include a plurality of anatomically-divided sections 101. Each anatomically-divided section 101 encloses a specific part of the human body. The anatomically-divided sections 101 include, but are not limited to, a left arm/wrist section, a left shoulder section, a left top torso section, a left middle torso section, a left pelvis torso section, a left knee section, a left ankle section, a left foot section, a head section, a right arm/wrist section, a right shoulder section, a right top torso section, a right middle torso section, a right pelvis torso section, a right knee section, a right ankle section, and a right foot section. Moreover, each mobile IMU 6 and each mobile electromagnet 3 are integrated into a specific section from the plurality of anatomically-divided sections 101. Consequently, the specific section is able to sense its orientation and positioning within the corridor 2 with its mobile IMU and is then able to adjust the magnetic force felt on itself with its mobile electromagnet.

Figure 5:
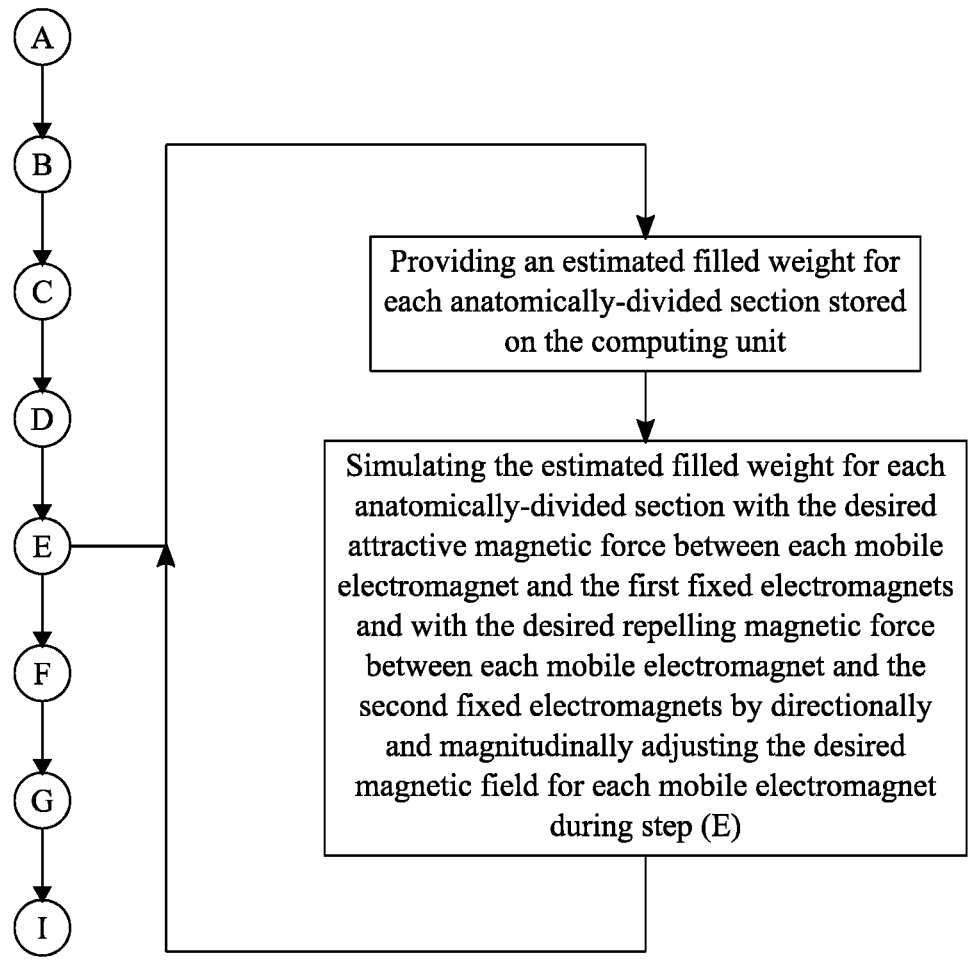
FIG. 5 is a flowchart illustrating a subprocess for simulating an estimated filled weight for each anatomically-divided section of the bodysuit.

In order for the present invention to further mimic the effects of gravity on a user's body, the computing unit 7 stores an estimated filled weight for each anatomically-divided section 101, which is the weight of a part of the human body that is enclosed by an anatomically-divided section. The estimated filled weight for each anatomically-divided section 101 can be predetermined by a user or can be gathered through a set of integrated biosensors within the bodysuit 1. As can be seen in FIG. 5, the computing unit 7 directionally and magnitudinally adjusts the desired magnetic field 4 for each mobile electromagnet 3 during Step E in order to simulate the estimated filled weight for each anatomically-divided section 101 with the desired attractive magnetic force between each mobile electromagnet 3 and the first fixed electromagnets 8. In addition, the computing unit 7 directionally and magnitudinally adjusts the desired magnetic field 4 for each mobile electromagnet 3 during Step E in order to further simulate the estimated filled weight for each anatomically-divided section 101 with the desired repelling magnetic force between each mobile electromagnet 3 and the second fixed electromagnets 9.

Figure 6:
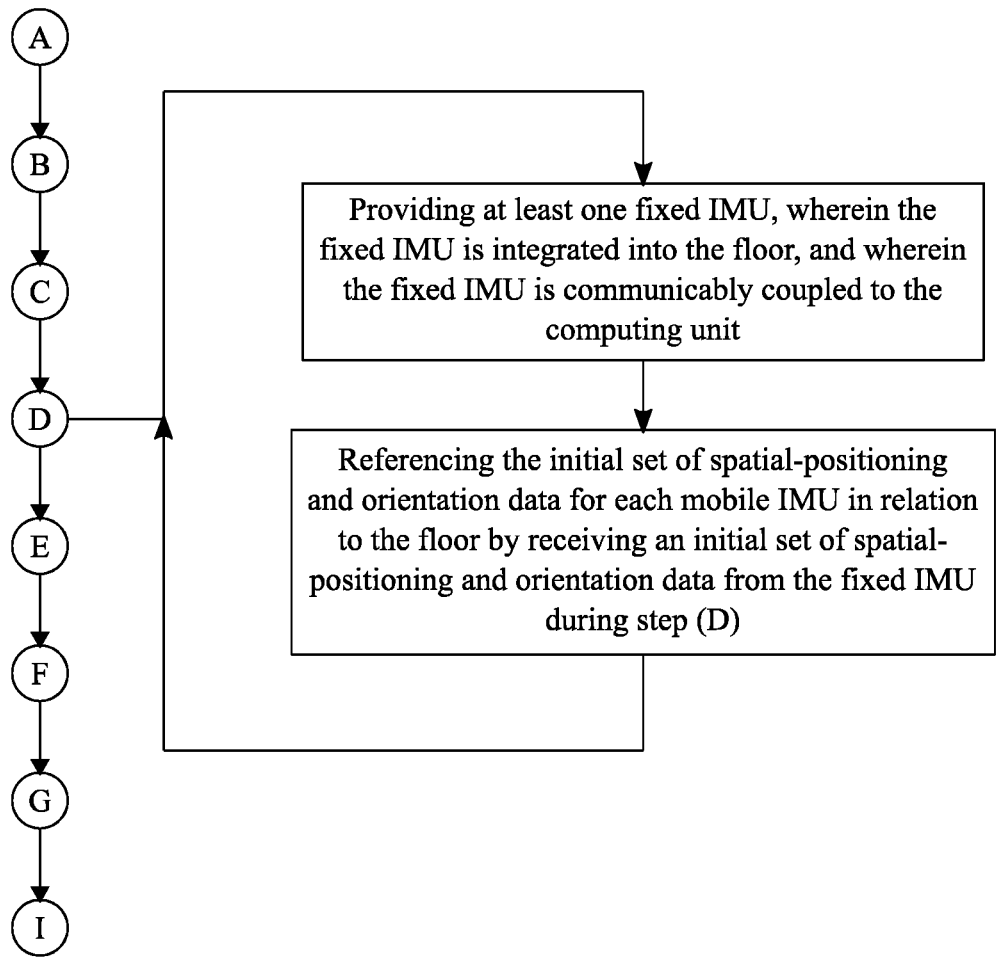
FIG. 6 is a flowchart illustrating a subprocess for referencing the spatial positioning and orientation data of the corridor.

When the present invention is being used in outer space, the computing unit 7 needs to reference the spatial-positioning and orientation data for each mobile IMU in relation to the corridor 2, which is shown in FIG. 6. Thus, the present invention provides at least one fixed IMU 11 that is integrated into the floor 202 of the corridor 2 and is communicably coupled to the computing unit 7. The fixed IMU 11 is then able to receive an initial set of spatial-positioning and orientation data so that the initial set of spatial-positioning and orientation data for each mobile IMU 6 is in relation to the floor 202 of corridor 2.

Figure 7:
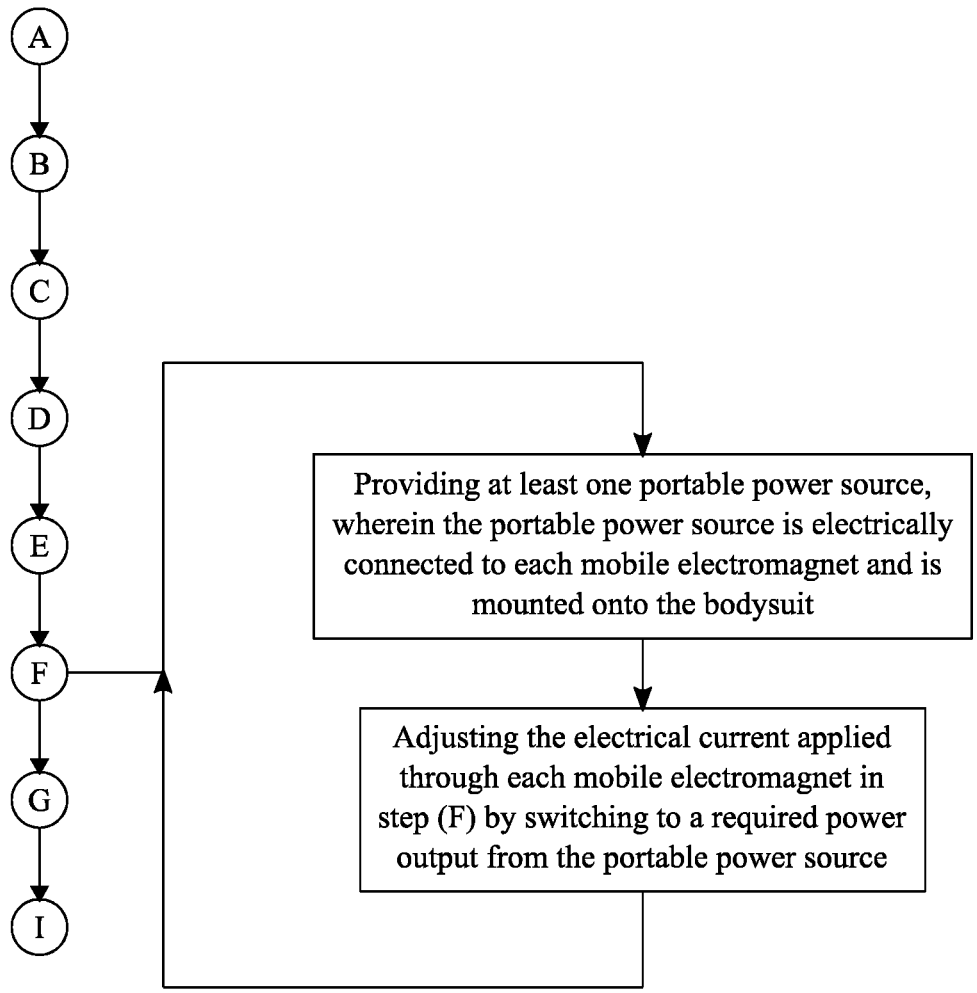
FIG. 7 is a flowchart illustrating a subprocess for adjusting the electrical current applied through each mobile electromagnet.

In order for the present invention to be able to readily adjust the magnetic field of each mobile electromagnet 3, the present invention provides at least one portable power source 5, which is electrically connected to each mobile electromagnet 3 and is mounted onto the bodysuit 1. Thus, the electrical current that is applied to each mobile electromagnet 3 is adjusted in Step F by switching to a required power output from the portable power source 5, which is shown in FIG. 7. The present invention can use either a single portable power source for all of the mobile electromagnets 3 or a plurality of portable power sources, each of which is independently coupled to a corresponding electromagnet from the plurality of mobile electromagnets 3.

Figure 8:
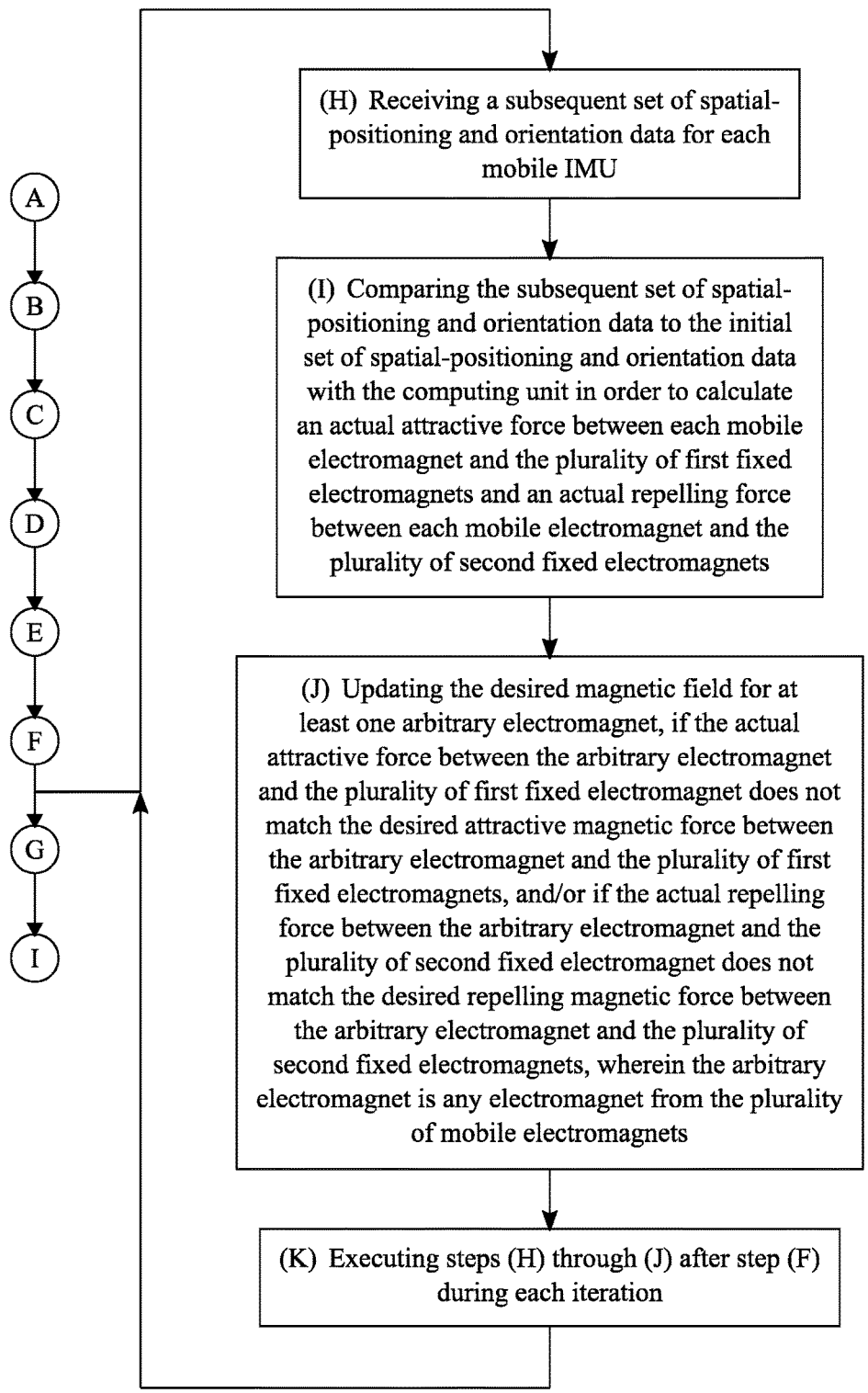
FIG. 8 is a flowchart illustrating a subprocess for adjusting in accordance to feedback between the mobile electromagnets and the mobile IMUs.

As can be seen in FIG. 8, the present invention also allows for a feedback loop during each iteration between receiving spatial-positioning and orientation data for each mobile IMU 6 and adjusting the desired magnetic field 4 for each mobile electromagnet 3. The feedback loop begins by receiving a subsequent set of spatial-positioning and orientation data for each mobile IMU (Step H). The computing unit 7 then compares the subsequent set of spatial-positioning and orientation data to the initial set of spatial-positioning and orientation data in order to calculate an actual attractive force between each mobile electromagnet 3 and the plurality of first fixed electromagnets 8 and an actual repelling force between each mobile electromagnet and the plurality of second fixed electromagnets 9 (Step I). The feedback loop continues by updating the desired magnetic field 4 for at least one arbitrary electromagnet (Step J). Step J is executed if the actual attractive force between the arbitrary electromagnet and the plurality of first fixed electromagnets 8 does not match the desired attractive magnetic force between the arbitrary electromagnet and the plurality of first fixed electromagnets 8, and/or if the actual repelling force between the arbitrary electromagnet and the plurality of second fixed electromagnets 9 does not match the desired repelling magnetic force between the arbitrary electromagnet and the plurality of second fixed electromagnets 9. Moreover, the arbitrary electromagnet can be any electromagnet from the plurality of mobile electromagnets 3. The feedback loop concludes by executing Step H through Step J after Step F during each iteration.

Supplemental Description

The present invention is a wearable suite that consists of electromagnets, force sensors, mini-computers and corridors, to create artificial gravity environments in space or low gravity areas. The system would adjust small electromagnets on the suite to increase/decrease current/voltage based on distance from the main electromagnet to match the items required weight. If attached to arm, the force would be adjusted to say 90N (20 lbs.), if attached to feet, the force would be adjusted to say 120N.

The components include large electromagnets, small electromagnets, force meters, distance sensors, switchable power supplies, computers and algorithm to keep system constantly adjusting current and voltage to maintain constant force based on height from main electromagnet.

The first step is to create a corridor of large direct current (DC) electromagnets that each would have the dimensions of 2'×2. These large electromagnets would have a constant current and voltage applied. Once corridor is created, a suite with hundreds of small electromagnets would be attached to multiple portable switching power supplies along with distance sensing devices to determine their height from the main electromagnet floor corridor. User would input desired required force equivalency in computer and the system would regulate the current to all the smaller electromagnets to give the sensation of "weight" in a weightless or lower gravity environment.

Some miscellaneous features of the present invention include: main processor would connect to all the sub processor and be located on the back or in the front of the torso or even controlled from a central system within the corridor to control multiple people individually; each sub-processor will have multiple electromagnets that it controls; and two corridors on each side of the electromagnets in the floor, wherein the two corridors basically maximize efficiency and space.

Although the invention has been explained in relation to its preferred embodiment, it is to be understood that many other possible modifications and variations can be made without departing from the spirit and scope of the invention as hereinafter claimed.

What is claimed is:

1. A method of producing artificial gravity in an electromagnetized environment, the method comprises the steps of:
    (A) providing a bodysuit and a corridor, wherein a plurality of mobile electromagnets is integrated throughout the bodysuit, and wherein a plurality of mobile inertial measurement units (IMUs) is integrated throughout the bodysuit, and wherein a plurality of first fixed electromagnets is integrated throughout a floor of the corridor, and wherein a plurality of second fixed electromagnets is integrated through a ceiling of the corridor;
    (B) providing at least one computing unit, wherein each mobile electromagnet and each mobile IMU is communicably coupled to the computing unit;
    (C) continuously generating a uniform magnetic field from the first fixed electromagnets to the second fixed electromagnets;
    (D) receiving an initial set of spatial-positioning and orientation data for each mobile IMU;
    (E) calculating a desired magnetic field for each mobile electromagnet from the initial set of spatial-positioning and orientation data for each mobile IMU with the computing unit, wherein an interaction between the uniform magnetic field and the desired magnetic field for each mobile electromagnet produces a desired attractive magnetic force between each mobile electromagnet and the first fixed electromagnets and produces a desired repelling magnetic force between each mobile electromagnet and the second fixed electromagnets;
    (F) generating the desired magnetic field for each mobile electromagnet by adjusting an electrical current applied through each mobile electromagnet; and
    (G) executing a plurality of iterations for steps (C) through (F) as the bodysuit moves through the corridor.

2. The method of producing artificial gravity in an electromagnetized environment, the method as claimed in claim 1, wherein the uniform magnetic field is oriented normal from the floor to the ceiling.

3. The method of producing artificial gravity in an electromagnetized environment, the method as claimed in claim 1, wherein the desired magnetic field for each mobile electromagnet is oriented normal towards floor and away from the ceiling.

4. The method of producing artificial gravity in an electromagnetized environment, the method as claimed in claim 1, wherein the at least one computing unit is a plurality of computing units, and wherein each computing unit is housed with a corresponding IMU from the plurality of mobile IMUs and a corresponding electromagnet from the plurality of mobile electromagnets, and wherein each computing unit is communicably coupled to the corresponding unit and the corresponding electromagnet.

5. The method of producing artificial gravity in an electromagnetized environment, the method as claimed in claim 1, wherein the bodysuit includes a plurality of anatomically-divided sections, and wherein each mobile IMU is integrated into a specific section from the plurality of anatomically-divided sections, and wherein each mobile electromagnet is integrated into a specific section from the plurality of anatomically-divided sections.

6. The method of producing artificial gravity in an electromagnetized environment, the method as claimed in claim 5 further comprises the steps of:
    providing an estimated filled weight for each anatomically-divided section stored on the computing unit; and
    simulating the estimated filled weight for each anatomically-divided section with the desired attractive magnetic force between each mobile electromagnet and the first fixed electromagnets and with the desired repelling magnetic force between each mobile electromagnet and the second fixed electromagnets by directionally and magnitudinally adjusting the desired magnetic field for each mobile electromagnet during step (E).

7. The method of producing artificial gravity in an electromagnetized environment, the method as claimed in claim 1 further comprises the steps of:
    providing at least one fixed IMU, wherein the fixed IMU is integrated into the floor, and wherein the fixed IMU is communicably coupled to the computing unit; and
    referencing the initial set of spatial-positioning and orientation data for each mobile IMU in relation to the floor by receiving an initial set of spatial-positioning and orientation data from the fixed IMU during step (D).

8. The method of producing artificial gravity in an electromagnetized environment, the method as claimed in claim 1 further comprises the steps of:
   providing at least one portable power source, wherein the portable power source is electrically connected to each mobile electromagnet and is mounted onto the bodysuit; and
   adjusting the electrical current applied through each mobile electromagnet in step (F) by switching to a required power output from the portable power source.

9. The method of producing artificial gravity in an electromagnetized environment, the method as claimed in claim 1 further comprises the steps of:
   (H) receiving a subsequent set of spatial-positioning and orientation data for each mobile IMU;
   (I) comparing the subsequent set of spatial-positioning and orientation data to the initial set of spatial-positioning and orientation data with the computing unit in order to calculate an actual attractive force between each mobile electromagnet and the plurality of first fixed electromagnets and an actual repelling force between each mobile electromagnet and the plurality of second fixed electromagnets;
   (J) updating the desired magnetic field for at least one arbitrary electromagnet, if the actual attractive force between the arbitrary electromagnet and the plurality of first fixed electromagnet does not match the desired attractive magnetic force between the arbitrary electromagnet and the plurality of first fixed electromagnets, and/or if the actual repelling force between the arbitrary electromagnet and the plurality of second fixed electromagnet does not match the desired repelling magnetic force between the arbitrary electromagnet and the plurality of second fixed electromagnets, wherein the arbitrary electromagnet is any electromagnet from the plurality of mobile electromagnets; and
   (K) executing steps (H) through (J) after step (F) during each iteration.

* * * * *